Jan. 19, 1971  S. KELLER  3,556,613
PROTECTION DEVICE AGAINST EXCESSIVE BRAKING OF A
VEHICLE WHEEL BRAKED BY COMPRESSED AIR
Filed April 2, 1969  2 Sheets-Sheet 1

SIEGFRIED KELLER, Inventor

By Wendroth, Lind & Ponack
Attorneys

SIEGFRIED KELLER, Inventor

By. Wenderoth, Lind + Ponack.
Attorneys

United States Patent Office 3,556,613
Patented Jan. 19, 1971

3,556,613
PROTECTION DEVICE AGAINST EXCESSIVE
BRAKING OF A VEHICLE WHEEL BRAKED
BY COMPRESSED AIR
Siegfried Keller, Effretikon, Switzerland, assignor to Werkzeugmaschinenfabrik Oerlikon-Buhrle AG., Zurich, Switzerland
Filed Apr. 2, 1969, Ser. No. 812,678
Claims priority, application Switzerland, Apr. 5, 1968, 5,105/68
Int. Cl. B60t 8/02
U.S. Cl. 303—21                                3 Claims

ABSTRACT OF THE DISCLOSURE

A protection device provided with a pressure transformer whereby the pressure in the brake cylinder is adjustable by a distributor valve. The pressure transformer reverses the pressure between an upper and a lower pressure stage and is normally in the upper pressure stage. The protection device is provided also with a release mechanism responsive to excessive braking which normally by its operation upon the pressure transformer temporarily reverses it to the lower pressure stage. A safety device also prevents such reversal as long as the pressure in an auxiliary air container is below a predetermined pressure and prevents lowering of the pressure in the braking cylinder after a plurality of succeeding operations of the release mechanism has brought the pressure to a minimum value.

---

Figure 1:
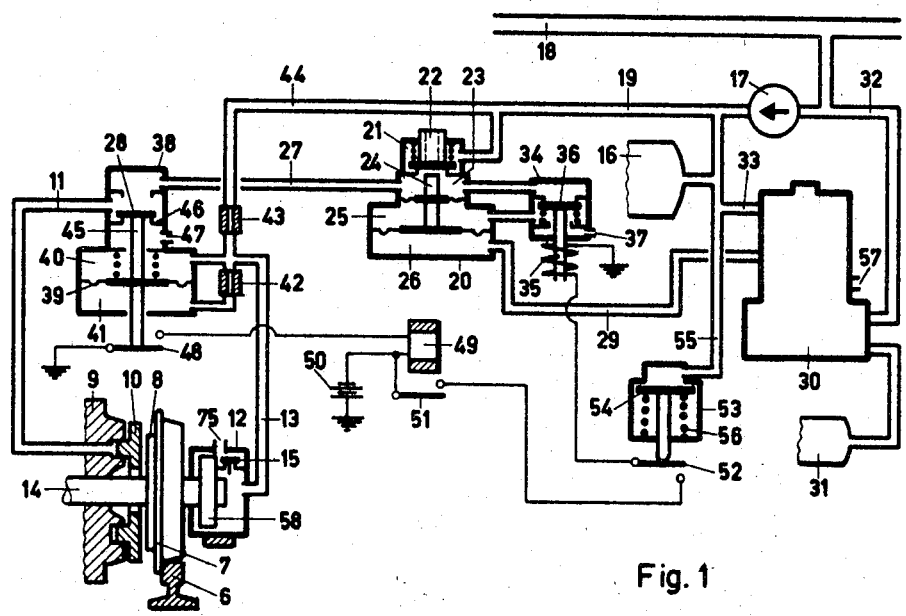

This invention relates to a protection device against the excessive braking of a vehicle wheel braked by compressed air, more particularly of railway vehicles, wherein the brake cylinder can be acted upon by compressed air from an air storage container in an upper and a lower pressure stage with change-over switching, and in which an actuating element is provided which normally brings the upper pressure stage into action and which reacts to any excessive braking of the vehicle wheel whereby the lower pressure stage can be switched on temporarily.

In the case of a known protection device of this type, the actuating element brings the lower pressure stage into action time it reacts. Furthermore, this actuating element only reacts when the vehicle wheel has come to a standstill. This mode of operation is frequently undesirable.

In the case of braking fast trains travelling at high speed on rails which are in a slippery condition over a long distance, the actuating element of the known protection device would react a pluarlity of times consecutively, which would result in a plurality of emptyings and chargings of the brake cylinder. In this case the air storage container would be continually emptied, so that only a constantly decreasing pressure would be available to act upon the brake cylinder. It is easy to see that in this case there is a danger that an inadmissably low pressure would be adjusted in the brake cylinder during the lower pressure stage when switched on temporarily. The risk of non-circular places being produced on the vehicle wheel would be increased by the fact that the actuating element reacts only when the vehicle wheel no longer has any velocity of revolution.

An object of the invention is to improve a protection device according so that the dangers mentioned are eliminated. According to the invention, a safety element is provided which reacts to a minimum pressure in the air storage container and the reaction of which prevents the lower pressure stage from being switched on by the actuating element which reacts to excessive decelerations of the running wheel of the vehicle.

Figure 2:
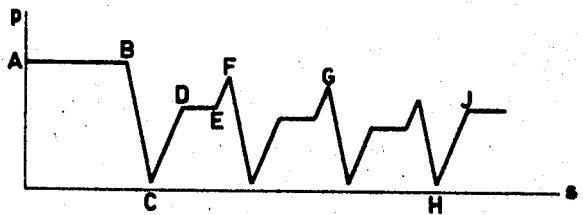
Figure 3:
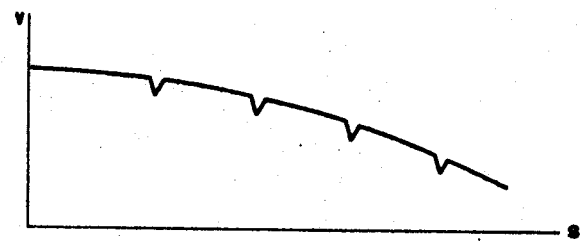
Figure 4:
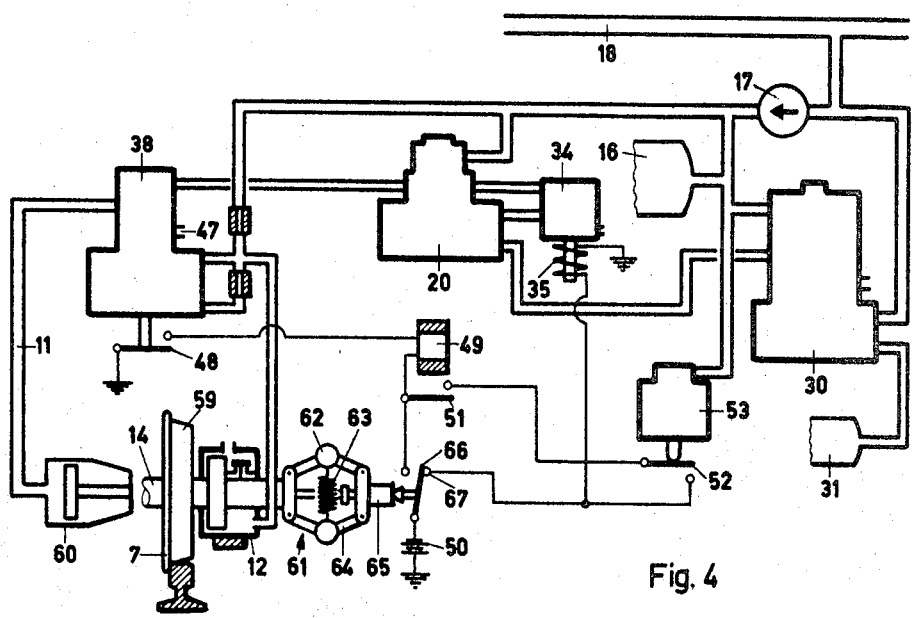
Figure 5:
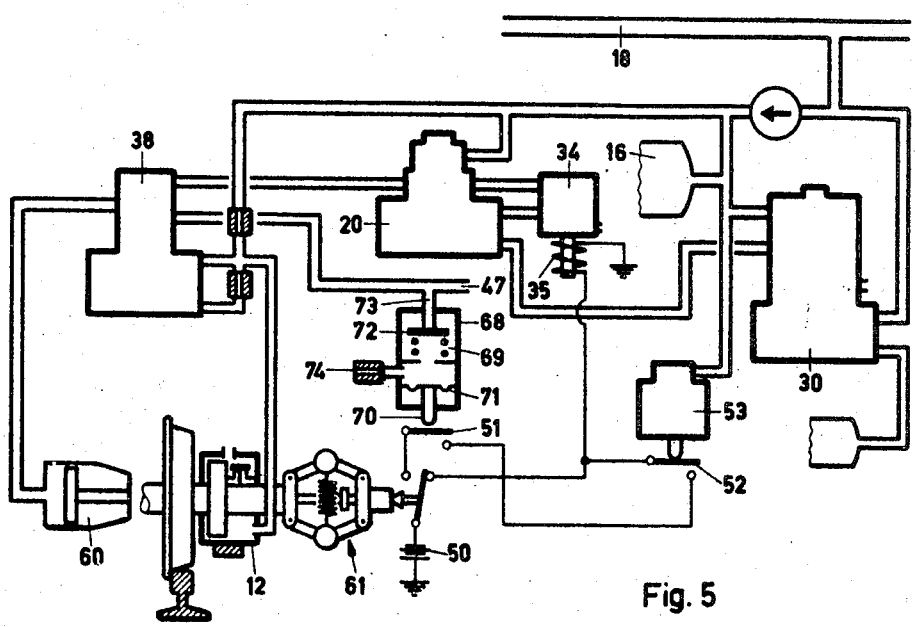

With the above and other objects in view which will become apparent from the detailed description below, three preferred embodiments of the invention are shown in the drawings in which:

FIG. 1 shows a schematic illustration of a first example of the protection device,
FIG. 2 shows the pressure curve loading the brake piston as a function of the distance travelled by the vehicle,
FIG. 3 is a diagram showing the circumferential velocity of a wheel as a function of the distance travelled,
FIG. 4 is a schematic illustration of a modified protection device, and
FIG. 5 is a schematic showing of another modification of the invention.

According to FIG. 1, a wheel 7 of a railway vehicle, which rolls upon a rail 6, is provided with a brake disc 8 against which a piston 10 guided with axial sliding mobility in the housing 9 can be urged by means of compressed air from a pipe 11. In a housing secured to the vehicle in a manner not shown, a tripping element 12 is accommodated, as illustrated and described e.g. in U.S. Pat. 2,366,044. The tripping element has a normally closed valve 15 which connects a pipe 13 to an outlet 75. The valve 15 is secured on an element which revolves with the wheel axle 14, and is actuated by an inertia element 58, which is likewise mounted on the axle 14, and which is capable of rotating with respect to the axle 14 counter to spring pressure. In the case of excessive decelerations of the wheel 7—i.e., decelerations of approximately 3–4 m./sec.$^2$ at the wheel circumference, the tripping element reacts and opens the valve 15.

The piston 10 is acted upon by compressed air from an air storage container 16 which is connected via a non-return valve 17 to the brake pipeline 18. From the container 16, a pipe 19 leads to a chamber 21 of a pressure transformer 20, in which a spring-loaded valve element 22 provided with an axial bore is guided with sliding mobility. The valve element 22 is normally urged by the spring-loading onto a valve seat, so that the chamber 21 is sealed off from a second chamber 23 located beneath the valve element. A valve tappet 24 is supported by two membranes of different diameter, so that the further pressure chambers 25 and 26 are mutually separated. In the case of an upward displacement of the valve tappet 24, the latter strikes against the valve element 22 and seals its axial bore, whereby the venting of the chamber 23 which normally exists is interrupted. Upon further displacement of the valve tappet 24, the latter raises the valve element 22 from its seat and thus connects the two chambers 21 and 23. Compressed air is thereby fed to the chamber 23 from the container 16 and passes via a connection 27, at a change-over valve 28 which normally occupies the position illustrated, to the pipe 11 of the piston 10.

In order to actuate the valve tappet 24, the pressure chamber 26 is connected via a pipe 29 to a distributor valve 30. It is assumed of this valve, which is not illustrated in detail, that it is constructed as a triple pressure control valve and is accordingly provided with a control air container 31. Furthermore, the distributor valve 30 is connected via a pipe 32 to the brake pipeline 18, and via a pipe 33 to the air storage container 16, and it is provided with an outlet 57 for venting the pipe 29. In the case of an actuation of the brake by the locomotive driver, this produces a reduction of the pressure in the brake pipeline 18. Consequently the pressure of the control air container 31 is able to establish a connection between the air storage container 16 and the chamber 26 of the pressure transformer 20, which passes via the pipes 33 and 29.

The two chambers 23 and 25 of the pressure transformer 20 are connected to a change-over switch 34, for the actuation of which a solenoid 35 is provided. The change-over switch exhibits a spring-loaded sliding valve element 36, which when the solenoid 35 is de-energized rests upon its upper valve seat by the influence of its spring-loading, and thereby mutually separates the two chambers 23 and 25 of the pressure transformer 20, and connects the chamber 25 via an outlet 37 to the atmosphere. When the solenoid 35 is switched on, the valve element 36 is slid against its lower valve seat; by this means the two chambers 23 and 25 are mutually connected and the outlet 37 becomes sealed. In the illustrated rest position of the change-over switch 34, the upper pressure stage is effective in the case of braking, while in the other position of the change-over switch the lower pressure stage is effective. This is due to the fact that in the rest position of the change-over switch 34, due to the venting of the chamber 25, only the upper membrane of small diameter is critical for the restoration of the valve tappet 24 into the sealing position into which the valve element 22 rests upon its valve seat and the valve tappet 24 simultaneously seals the axial bore of the valve element 22. By contrast, when the solenoid 35 is energised, the upper small membrane of the pressure transformer 20 is inoperative, so that only the lower large membrane is critical for the restoration of the valve tappet 24.

The solenoid 35 can be switched on and off by means of the actuating element 38. The latter comprises two pressure chambers 40 and 41 accommodated in a housing and mutually separated by a membrane 39. The upper chamber 40 is connnected directly, but the chamber 41 via a throttle 42, to the pipe 13 leading to the tripping element already described. A connection 44 provided with a throttle 43 and connected via the pipe 19 to the container 16 is provided for filling the two chambers. The membrane 39 carries a valve tappet 45 connected to the valve element 28 already mentioned, and guided fluidtightly in two walls of the housing which seal the chambers 40 and 41. When the chambers 40 and 41 are subject to equal pressure, the valve element 28 rests upon a lower valve seat 46 under the influence of a spring $46^1$, so that the pipes 11 and 27 are mutually connected and are separated from an outlet 47. On the other hand, when the valve element 28 is slid upwards as far as an upper valve seat, the pipe 11 is separated from the pipe 27 and is connected via the outlet 47 to the atmosphere. The lower end of the valve tappet 45, which protrudes out of the housing of the activating element 38, is connected to an earthed contact 48.

The normally open contact 48 is placed, together with an earthed battery 50, in the circuit of a relay 49 provided with a delayed drop of approximately 3 sec. A work contact 51 of the latter forms, together with the battery 50 and a work contact 52 of a pneumatic switch 53, a further circuit containing the coil of the solenoid 35. A piston 54 of the switch 53, which is loaded by a tensioned spring 56, is loaded with the pressure of the container 16 via pipe 55. The tension of the spring 56 is conveniently chosen so that above a minimum pressure of approximately 3 kg./cm.$^2$ in the container 16, the piston 54 is slid downwards and the work contact 52 is made.

The principle of operation of the protection device described will be explained in further detail hereinbelow. When the brake pipeline 18 is pressureless and the containers 16 and 31 empty, all parts assume the positions illustrated. When the vehicle is travelling with the brake mechanism released, on the other hand, the brake pipeline 18 and both the containers are charged up to the service pressure of 5 kg./cm.$^2$. Consequently the pressure acting upon the piston 54 of the switch 53 is able to urge the said piston downwards, thereby making the work contact 52. Furthermore, the same pressure prevails in the two chambers 40 and 41 of the actuating element 38, and the valve tappet 45 is retained in the position illustrated by the spring loading it. Due to the open contact 48, the relay 49 has dropped, therefore its contact 51 is open and the circuit of the solenoid 35 is interrupted. The valve element 36 of the change-over switch 34 is thus in the position illustrated subject to the influence of the spring loading it and as mentioned this position corresponds to the upper pressure stage. The distributor valve 30 occupies the release position, in which it connects the pipe 29 to the outlet 57. The chamber 26 of the pressure transformer 20, which is consequently pressureless, retains the valve tappet 24 in the position illustrated, in which the chamber 23 and hence also the pipe 11 is vented via the axial bore of the valve element 22.

In order to perform a braking action, the locomotive driver reduces the pressure in the brake pipeline 18, resulting in the reaction of the distributor valve 30. After the outlet 57 has been sealed, a connection between the pipes 33 and 29 is established, via which the chamber 26 of the pressure transformer 20 is acted upon by a pressure corresponding to the said pressure reduction. Under the influence of this pressure, the valve tappet 24 slides upwards, seals the axial bore of the valve element 22 and raises the latter from its seat. Compressed air now flows from the container 16 via the pipe 19, the chambers 21 and 23 and the pipes 27 and 11 to the brake piston 10. This flow persists until the pressure in the chamber 23 is sufficient to slide the valve tappet 24 into the sealing position, in which the valve element 22 rests upon its seat.

If the rail 6 is in a slippery condition, then the braked wheel 7 may skid on the rail, in which case its velocity of revolution diminishes rapidly. The tripping element 12 reacts and opens the valve 15, whereby the chamber 40 of the actually element 38 is connected via the pipe 13 directly to the outlet 75. Whereas this chamber is immediately discharged, the discharge of the chamber 41 occurs only after a delay due to the throttle 42, so that an over-pressure is produced in the chamber 41 compared with the chamber 40, which slides the valve tappet 45 upwards. The raising of the valve element 28 from the lower valve seat 46 which then occurs produces a connection of the pipe 11 to the outlet 47, so that the brake piston 10 is relieved of the pressure loading it and the brake is released. Simultaneously, the contact of the valve element 28 against the upper valve seat interrupts the connection between the pipes 11 and 27, and the contact 48 is closed. The relay 49 therefore operates and makes the circuit by the contact 51 for the solenoid 35, which actuates the change-over switch 34 and thus brings the lower pressure stage into action.

Due to the release of the brake which has occurred, the wheel 7 accelerates again, while the valve 15 closes. The chambers 40 and 41 of the actuating element 38 are now charged once more from the container 16 via the pipes 19 and 44 and via the throttle 43 and/or the throttle 42, while the valve tappet 45 returns into the rest position by the influence of the spring loading it, as illustrated. By this means the brake piston 10 is again subjected to pressure in the manner described, and the relay 49 drops with a delay due to the contact 48 which opens. During the drop time the solenoid 35 remains energised, so that the lower pressure stage is effective for the supply of compressed air to the brake piston 10. The pressure $p$ corresponding to this stage is chosen sufficiently small for no skidding of the wheel to occur under normal conditions. After the relay 49 drops, the change-over switch 34 returns into the position illustrated, in which the upper pressure stage comes into action.

This process is illustrated graphically in FIGS. 2 and 3. FIG. 2 shows the curve of the pressure $p$ loading the brake piston 10 as a function of the distance $s$ travelled by the vehicle. FIG. 3 on the other hand shows the circumferential velocity of the wheel 7 as a function of the distance $s$. As FIG. 2 clearly shows, the braking process commences at the point A with a constant pressure $p$, determined by the upper pressure stage, as far as the point B. Here the wheel commences to skid, resulting in an immediate decrease of the pressure $p$ at the point C, Then the pressure $p$ increases to a lower value corresponding to the lower pressure stage at the point D. It thereupon remains unchanged as far as point E corresponding to the drop time of the relay 49. Then the pressure $p$ rises again to a higher value corresponding to the upper pressure stage at the point F. FIG. 3 clearly shows how the wheel velocity $v$ diminishes by a smaller amount at the moment of skidding, and afterwards reassumes its original value.

Although at the point F the pressure $p$ has a lower value than at the point B, because the volume of air necessary at the point C for a fresh supply of compressed air to the brake piston 10 is withdrawn from the container 16, the pressure in which therefore falls correspondingly, it is nevertheless possible for the wheel 7 still to be on a slippery section of rail at the point F, so that the tripping element reacts afresh. The described process of releasing and reapplication of the brake then occurs a second time in the described manner, while the pressure $p$ finally assumes the value corresponding to the point G. As FIG. 2 clearly shows, at each reaction of the protection device the pressure $p$ diminishes due to increasing discharge of the container 16, so that the braking in the lower pressure stage reaches a degree which results in a considerable lengthening of the braking distance. When the pressure in the container 16 falls to the minimum value referred to, the pressure switch 53 reacts and opens its work contact, so that energisation of the solenoid 35 is no longer possible. Consequently the upper pressure stage remains switched on permanently. If this is the case, e.g., at the point H, then the pressure $p$ now increases immediately to the value corresponding to the point J.

In FIGS. 4 and 5, those parts of the protection devices according to the second and third exemplary embodiments which are identical with parts of the first example are designated by the same reference numerals as in FIG. 1.

In the example according to FIG. 4, the wheel 7 is provided with a block brake acting upon the running surface 59 of the wheel 7, which is applied and released by means of the brake cylinder 60, in that compressed air is supplied to the latter via the pipe 11 or is released from it. Owing to the fact that the coefficient of friction between the brake block and the running surface of the wheel varies strongly with the speed of the wheel, the pressure transformer 20 is changed over from the lower to the higher pressure stage by means of a speed-dependent switch 61 when a speed of approximately 50 km./h. is exceeded. The said switch has two centrifugal weights 62 driven by the wheel axle 14, which are drawn toward each other by a spring 63. Two straps 64 connect the centrifugal weights 62 to an axially sliadable bolt 65 which is connected to a contact tongue of a change-over contact 66. At a low velocity of the wheel 7, the switch 61 assumes the position illustrated, in which a circuit passing from the battery 50 via the contact 66 to the solenoid 35 of the change-over switch 34 is made. The change-over switch 34 therefore brings the lower pressure stage into action. In the case of wheel velocities above 50 kg./h., the contact tongue of the switch 66 is moved over and a circuit for the relay 49 is thus prepared, which can be made via the contact 48 of the actuating element 38.

The braking process occurs in the same manner as has been described in connection with FIG. 1, provided the vehicle is travelling at over 50 km./h., so that the switch 61 has changed over to the upper pressure stage. If skidding of the wheel 7 occurs during such a braking process, then the tripping element 12 and the actuating element 38 react in the manner described in connection with FIG. 1, while the latter vents and brake cylinder 60 via the pipe 11 and closes the contact 48. Consequently the relay 49 operates, closing its work contact 51, consequently a circuit passing from the battery 50 via the contacts 66, 51, 52 and to the solenoid 35 is made. The change-over switch 34 therefore brings the lower pressure stage into action in the pressure transformer 20 in the manner described in connection with FIG. 1 during the drop time of the relay 49, which is approximately 3 sec. as in the first example. Due to the reaction of the actuating element 38, the brake cylinder 60 is connected via the pipe 11 to the outlet 47 and is vented in this way. Due to the reaction of the tripping element 12 at the commencement of the skidding of the wheel upon the rail, its reacceleration after the brake cylinder is vented, occurs so rapidly that the loss in velocity of the wheel remains slight, as is illustrated in FIG. 3. The switch 61 therefore generally retains its position—i.e., if the speed of the vehicle is not in proximity of the 50 km./h. limit.

If the tripping element 12 has reacted a plurality of times during such a braking process, so that the pressure in the container 16 falls below the limit value determined by the spring in the pneumatic switch 53, then the contact 52 opens and prevents the solenoid 35 from being energised. Consequently no change-over of the pressure transformer 20 to the lower braking stage is effected by the reaction of the actuating element 38, as was already described in connection with the first example. In the case of braking actions from speeds below 50 km./h., the switch 61 permanently occupies the position illustrated in FIG. 4, in which it closes the rest contact 67 which connects the battery 50 directly to the solenoid 35. When the actuating element 38 reacts due to skidding of the wheel 59, the relay 49 cannot react due to the work contact of the switch 51 which is now open. No gradual supply of compressed air to the brake cylinder 60 occurs, since the risk of skidding is in any case slight at low speeds.

The protection device according to the example of FIG. 5 differs from that of FIG. 4 solely as regards the switching on and off of the solenoid 35. The relay 49 of FIG. 4 is replaced by a pressure switch 68 to actuate the work contact 51. A chamber 69 of this switch is sealed by a membrane 71 supporting a tappet 70. It further contains a spring-loaded valve element 72, which normally seals a pipe connection 73 connected to the outlet 47 of the actuating element 38, and is vented via a throttle 74.

When the actuating element 38 reacts, the compressed air flowing out through the outlet 47 generates a pressure in the pipe connection 73, which lifts the valve element 72 from the pipe connection 73 counter to the spring force loading it, so that the chamber 69 becomes filled with compressed air, which flows out slowly via the throttle 74. This pressure closes the work contact 51 in the same manner as is effected by the relay 49 in the example of FIG. 4. In other respects the processes upon reaction of the tripping element 12 take place in the same manner as was described in connection with FIG. 4.

I claim:

1. A device for protecting a vehicle wheel, braked by compressed air, more particularly railway vehicle wheels, against excessive braking, comprising braking means having a cylinder for a wheel, an air storage container, means for supplying compressed air to said cylinder from said air storage container, said supplying means having a pressure transformer for supplying compressed air in an upper and lower pressure stage, change over switching means connected to said transformer for reversing said stages, a tripping element reacting to excessive decelerations of said wheel, a time relay connected to said change over switching means and actuated by said tripping element, said time relay being provided with a delayed drop for controlling the switching-on period of said lower pressure stage after excessive deceleration of said wheel, a safety element reacting to a minimum pressure in said air storage container and means operated by said safety element preventing said lower pressure stage from being switched on by said switching means under the control of said time relay.

2. A device according to claim 1, comprising a pressure transformer actuated in said lower or in said upper pressure stage, and a change-over switch dependent upon the speed of said vehicle wheel preventing the actuation of said pressure transformer in said upper pressure stage below a predetermined limit speed.

3. A device according to claim 2, wherein in a reaction of said safety element above said predetermined limit speed, means are provided to maintain said pressure tarnsformer in said upper pressure stage independently of said time switch.

References Cited

UNITED STATES PATENTS

| | | | |
|---|---|---|---|
| 2,088,169 | 7/1937 | Hewitt | 303—21 |
| 2,718,939 | 9/1955 | Bent et al. | 303—21UX |
| 2,800,370 | 7/1957 | Whitney | 303—21 |
| 2,804,353 | 8/1957 | Bush | 303—21 |

MILTON BUCHLER, Primary Examiner

J. J. McLAUGHLIN, JR., Assistant Examiner

U.S. Cl. X.R.

188—181; 303—40